H. W. OLSEN.
PULLEY KEY LOCK.
APPLICATION FILED JULY 14, 1921.
1,418,728. Patented June 6, 1922.
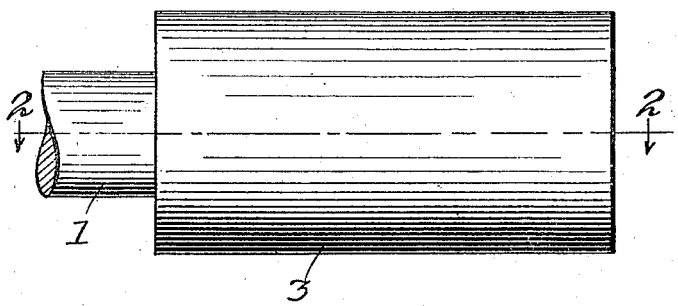
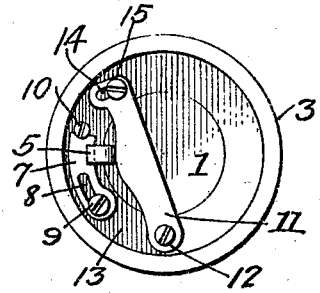
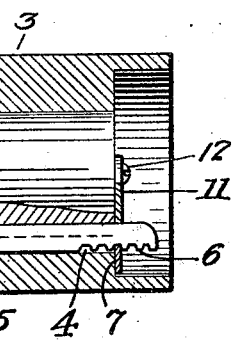
Witness
E. P. Cleary
Inventor:
Hans W. Olsen

UNITED STATES PATENT OFFICE.

HANS W. OLSEN, OF MOMENCE, ILLINOIS.

PULLEY KEY LOCK.

1,418,728.  Specification of Letters Patent. Patented June 6, 1922.

Application filed July 14, 1921. Serial No. 484,792.

*To all whom it may concern:*

Be it known that I, HANS W. OLSEN, citizen of the United States, residing at Momence, in the county of Kankakee and State of Illinois, have invented certain new and useful Improvements in Pulley Key Locks, of which the following is a specification.

This invention relates to pulley key locks and it consists in the novel features hereinafter described and claimed.

An object of the invention is to provide simple and effective means for securely holding the key member in the key grooves of a pulley and shaft.

A further object of the invention is to provide a device of the character stated which may be easily and quickly manipulated whereby the key may be released and readily withdrawn from the key grooves and when it is desired to remove the pulley from the shaft.

With these and other objects in view the invention consists in providing teeth upon the outer portion of the key. A dog or pawl member is adjustably mounted upon the hub of the pulley and may engage in the spaces between the teeth whereby the key is held against longitudinal movement. Means are provided for securing the dog or pawl at a fixed position. A bar is pivotally mounted upon the hub of the pulley and is adapted to bear against the side edge of the key and hold the same against lateral movement. Means are mounted upon the hub of the pulley for holding the bar at a fixed position.

In the accompanying drawing:—

Figure 1 is a side view of the pulley and a portion of the shaft to which the device may be applied.

Figure 2 is an end view of the pulley and shaft with the key lock applied.

Figure 3 is a fragmentary side view of a shaft with parts broken away and showing the pulley in section and showing the key in side elevation, and the locking mechanism in section. The view as shown in Figure 3 is cut on the line 2—2 in Figure 1.

As illustrated in the accompanying drawing the shaft 1 is provided with a key groove 2. The hub of the pulley 3 is provided with a key groove 4. These grooves register with each other when the pulley is in position upon the shaft.

The key 5 is adapted to be inserted in the registering grooves in a usual manner, whereby the pulley is fixed upon the shaft. The key 5 is provided at its outer end portion and at one side edge with spaced teeth 6.

The key locking mechanism includes a pawl 7 mounted upon the hub of the pulley. The pawl is provided at one end portion with a slot 8 and a screw 9 passes through the said slot and is screwed into the hub of the pulley. A screw 10 is threaded into the hub of the pulley and the head of the screw 10 is adapted to bind upon the free end portion of the pawl 7 whereby the said pawl is held at a fixed position after it has once been adjusted.

After the key 5 is inserted in the key grooves, the inner edge of the pawl 7 is inserted in the space between two of the teeth 6 and the screws 9 and 10 are tightened. Thus the pawl is secured upon the hub of the pulley and the key 5 is held against longitudinal movement.

A bar 11 is pivotally mounted upon a screw 12 which is screwed into the hub of the pulley. The bar is provided at one side edge with a hump 13 which bears against the side of the key 5. The bar 11 is provided at its free end portion with a transversely disposed slot 14. A screw 15 passes through the slot 14 and is screwed into the hub of the pulley 3. The head of the screw is adapted to bear against the outer surface of the bar 11 when the screw is tightened. Thus the bar is held at a fixed position and bears against the key and holds the same against lateral movement.

When it is desired to remove the pulley from the shaft, the screw 15 is loosened and the free end portion of the bar 11 is swung away from the key. The screw 10 may then be loosened whereby the edge portion of the pawl 7 may be removed from between the teeth 6. Thus the key is released and may be pulled out of the key grooves in a usual manner. When the key is removed from the key grooves the pulley may be removed from the shaft.

The pawl 7 and the bar 11 and the securing devices used in connection therewith are housed within the flange of the pulley and hence the parts are not in the way nor do they present obstruction when the locking device is applied.

Having described the invention what is claimed is:—

1. In combination with a shaft and pulley having key grooves a key lock comprising a key member having teeth and locking means mounted upon the pulley and adapted to engage between the teeth.

2. In combination with a shaft and pulley having key grooves a key lock comprising a key member having teeth, a locking means mounted upon the pulley and adapted to engage between the teeth to prevent longitudinal movement of the key member and means mounted upon the pulley and engageable with the key member to prevent lateral movement thereof.

3. In combination with a shaft and pulley having key grooves a key lock comprising a key member having teeth, a pawl pivotally mounted upon the pulley and adapted to engage between the teeth of the key, means for securing the pawl at a fixed position, a bar pivotally mounted upon the pulley and engagable with the key to prevent lateral movement thereof and means for securing the bar at a fixed position.

In testimony whereof I affix my signature.

HANS W. OLSEN.